Aug. 23, 1966

KIYOSHI INOUE 3,267,710

IMPULSIVE SHAPING AND BONDING OF
METALS AND OTHER MATERIALS

Filed Sept. 24, 1963

KIYOSHI INOUE
INVENTOR.

BY Karl F. Ross

AGENT

United States Patent Office 3,267,710
Patented August 23, 1966

3,267,710
IMPULSIVE SHAPING AND BONDING OF METALS AND OTHER MATERIALS
Kiyoshi Inoue, 182 3-chome, Tamagawayoga-machi, Setagaya-ku, Tokyo, Japan
Filed Sept. 24, 1963, Ser. No. 311,061
Claims priority, application Japan, Sept. 24, 1962, 37/41,770; Oct. 1, 1962, 37/43,376; Dec. 25, 1962, 37/58,729
16 Claims. (Cl. 72—56)

My present invention relates to the use of impulsive techniques in forming bodies, bonding discrete bodies together, and altering the physical conformation of metallic and nonmetallic materials. This application is a continuation-in-part of my copending applications Ser. Nos. 41,080; 92,284, now Patent No. 3,207,582; 104,758, now Patent No. 3,208,254; and 247,387 filed July 6, 1960; February 28, 1961; April 21, 1961 and December 26, 1962, respectively.

It is well known that rapidly applied or so-called "instantaneous" pressures can be employed to shape metallic and nonmetallic bodies and, in the presence of elevated temperatures, to deform such bodies. Among earlier techniques operating under this principle is the well-known method of cold forging wherein a metallic body is repeatedly subjected to hammer-like blows by a forging die, the kinetic energy of the forging operation being, for the most part, generated by fly-wheel drives, pneumatic devices and like systems for converting one type of mechanical energy into another. In hot-forging processes, the impulsive action of the forging hammer is able to deform the workpiece to a greater extent as a consequence of the heating of the latter. In addition, it is common to employ impulsive pressures of the character described and relatively high static pressures for the bonding of materials together in the presence of elevated temperatures. Processes of the latter type are generally designated by the term "sintering" and are applicable for the joining of discrete bodies having relatively large surface areas as well as individual particles of a powder. It has also been proposed heretofore to produce articles composed of discrete particles which have been bonded together under elevated pressures, generally with the aid of an adhesive. In all of the cases previously mentioned, the apparatus required for the development of the impulsive or static pressures is extremely complicated and expensive. Moreover, it has been found to be difficult, without the aid of complicated control apparatus, to regulate processing times, pressures and efficiency of transfer of kinetic energy in these known systems.

It is, consequently, the principal object of the present invention to provide a method of shaping metallic and nonmetallic materials whereby the aforementioned disadvantages can be obviated.

A further object of this invention is to provide an improved apparatus for the impact shaping of bodies in a highly efficient and controllable manner, the apparatus being relatively inexpensive in nature.

Still another object of this invention is to provide an improved method of and an apparatus for the low-temperature bonding of discrete bodies to yield products of high strength.

These objects and others will become apparent hereinafter are attained, in accordance with the present invention, by subjecting the body to be treated to impulsive shock waves developed in a liquid medium. I have discovered that it is possible to develop in a closed vessel containing a liquid medium an impulsive or momentary shock wave which can be transferred with high efficiency to a workpiece via a movable element in order to shape or deform the latter or cause its bonding to other discrete bodies in contact with the workpiece. Surprisingly, the relatively instantaneous or momentary development of a shock within a body of relatively viscous fluid (i.e. a liquid) is found to produce a shock wave whose velocity and energy is such that, upon transfer of this energy to the body to be treated, the molecules or atoms of this body are activated so that a plastic deformation of the body results with alteration of molecular structure. Under certain circumstances, discrete bodies in contact with one another can be bonded together when subjected to treatment by shock impulse of this character. While the use of so-called shock tubes has grown in importance of late, these devices, which generally make use of ionized gases to transfer energy to unionized gas particle and thus propagate a perturbation wave or disturbance in a gaseous medium, have not been successfully used for machining applications as a consequence of the practical limitations inherent in the devices, the difficulty of controlling the shock waves, and the inability to efficiently exploit the energy of these waves. Now it has been found that these disadvantages can be totally avoided if the initial shock is developed in a liquid in a closed system at elevated pressure and the liquid medium employed to transfer energy via the resulting pressure wave to the workpiece.

While it is contemplated, in accordance with the present invention, to employ explosive detonation of gases in a liquid as a source of the shock wave, I discovered that most efficient results, with a high degree of controllability, are obtained by the conversion of electrical energy into a mechanical shock wave. Thus it is the principal feature of the present invention to develop a shock or pressure wave in a liquid medium in a closed vessel by passing an electric current through a conductor surrounded by liquid medium and developing an electrical discharge at this conductor to produce the shock wave. Both momentary or spark discharges and sustained or arc discharges are suitable in accordance with the present invention, the shock wave resulting in large part from ionization of material in the region of the discharge. The shock wave, which radiates in the liquid medium from the electrical discharge in the manner of a sound wave, is, in part, a consequence of the increase in kinetic energy of the particles (i.e. atoms or molecules) in the region of the discharge, this kinetic energy increase resulting from ionization, thermal increase in the velocity of the particles, mechanical expansion as a consequence of the varporization of liquid or electrode material, and magnetic forces applied to the ionized particles.

In my copending application Ser. No. 92,284 I describe a method of converting a graphitic carbon lattice to a diamond structure wherein use is made of the high-impulsive pressures and temperatures resulting from electric spark discharge in a liquid medium. The liquid, preferably a dielectric, could be confined to augment the spark pressure by the increased hydraulic pressure of the liquid within the closed vessel.

The present invention is, therefore, an extension of the principles described in this latter application and my applications Ser. No. 41,080 and 104,758 in that it makes use of impulsive spark pressures which, in the present case, are transferred as a shock wave via the liquid medium to the workpiece. It is contemplated, in accordance with the present invention, to dispose a piston in the path of the shock wave, for displacement thereby. This piston, which can constitute the workpiece itself or be mechanically coupled therewith, advantageously has a working face extending generally parallel to the spark or arc discharge. While it might be believed, upon initial consideration of the shock-wave phenomenon that the wave front of the pressure wave radiates outwardly from the electrical discharge uniformly in all directions about the spherical solid angle at the discharge, the wave front thus having a spherical configuration, experimental evidence and extensive theoretical investigations have demonstrated that the pressure wave is not spherically symmetrical but that, rather, the pressure wave has a maximum amplitude in a plane perpendicular to the arc or spark gap intermediate the spark electrodes. Thus, the predominant pressure wave is of circular rather than spherical character and radiates outwardly from the discharge and the common axis of the electrodes in a direction perpendicular to the latter, a surface transverse to a perpendicular to this axis being disposed so as to receive maximum kinetic energy from the pressure wave.

It has been found that the use of a static, closed system, i.e. a system wherein the dielectric liquid remains stationary with respect to the spark gap, prevents attainment of the most effective conversion of electrical energy into kinetic energy in the form of the pressure wave. While the reason for the loss in energy transfer in this case is not fully understood, it is believed that the initial discharge results in the formation of particles of the electrode as well as gases produced by decomposition of the dielectric liquid, the electrode particles absorbing kinetic energy which is not retransferred to molecules of the liquid for subsequent use while the gases presumably act as compressible fluids absorbing some of the energy of the wave in a damping process. Moreover, the constancy of the dielectric has been found to be a factor in satisfactory energy transformation.

It is, consequently, a further feature of the present invention to provide a closed system for the development of the pressure wave wherein, however, the liquid is continuously circulated during the discharge so that electrode detritus and any developed gases are swept away from the region of the spark gap and prevented from interfering with the shock wave while a dielectric liquid of substantially constant composition is maintained in the region of the discharge. Accordingly, a high-pressure circulating pump can be provided in series with the liquid chamber for continuously drawing liquid out of this chamber and feeding fresh liquid into the latter while maintaining the liquid within the chamber under a relatively high static pressure (e.g. 8.5 kg./cm.$^2$ and upwards thereof). The pressure applied to the workpiece is thus the sum of the static pressure and the kinetic pressure of the shock wave. Advantageously, filter means is disposed within the circulating path for removing entrapped gases and solid particles. An increase in energy transfer of approximately 10% can be accomplished by liquid circulation in the manner described.

In accordance with still another feature of the present invention, means is provided for prolonging the duration of the shock wave. In simple systems, wherein a pair of pointed electrodes are juxtaposed and a spark developed across them, the pressure wave peaks rapidly and falls off quickly so that, while relatively high pressures are attainable, the duration of elevated pressure is relatively small and cannot be brought to bear upon the workpiece for periods sufficient to effect satisfactory treatment thereof under some circumstances. I have found that it is possible to increase the duration of the pressure wave without increasing the amount of electrical energy necessary for producing it or materially reducing the amplitude of this wave. Consequently, the total energy converted from electrical discharge to mechanical work and equivalent to the amplitude of the pressure wave integrated over time can be markedly increased. This increase is accomplished, in part, by providing a discharge-electrode system having a fusible element adapted to melt upon passage of electrical current and thus produce an increased discharge gap. The electrode system can thus comprise a relatively massive electrode with which a relatively thin electrode is juxtaposed. Initially, the electrodes may contact one another, although it is desirable to maintain a small gap therebetween. When an electrical pulse is applied to the electrode, the relatively thin electrode burns away to produce a large spark gap across which the primary discharge is sustained for the duration of the electrical pulse. Thus the characteristic of a discharge within the liquid medium can include a relatively low power spark discharge between the thin electrode and the massive one followed by melting of a portion of the thin electrode and the development of a higher-energy spark across the larger gap thus created. Advantageously, the thin electrode passes through a further massive electrode juxtaposed with the first-mentioned massive electrode across a spark gap of the desired magnitude, additional length of the thin electrode being fed into the gap so that the spark/melting/spark sequence can be repeated for successive electrical pulses. In this manner, the total electrical discharge is found to be approximately four times longer than a simple spark discharge with similar electrical parameters, the efficiency of electrical conversion to mechanical energy being similarly increased. While reference has been made herein to the duration of the electrical discharge, it should be noted, that the pressure wave in the liquid medium follows this discharge and has an amplitude proportional to the amplitude of the discharge and a duration proportional to the duration thereof. Moreover, the duration of the discharge can be increased still further by providing a plurality of thin electrodes, advantageously spaced in the direction in which the pressure wave amplitude is a maximum. When a plurality of relatively thin electrodes is provided, all of the electrodes must melt before the high-energy or large spark is developed. Consequently, pulse duration can be increased up to three times by the use of three thin-wire electrodes. Since the velocity of the workpiece or forming speed is, to a certain extent, a function of the rate at which the inertia of the workpiece or workpiece surface is overcome by the pressure wave, an increase in the duration of the pressure wave can result in an increase in the forming speed. One or more of the multiple thin electrodes may be staggered along the axis of the electrodes so that the initial slow development of a discharge is followed by a subsequent rapid development of a high-energy spark.

A further increase of some 30 to 60% in the utilization of the pressure wave can be attained, in accordance with the invention, by minimizing kinetic rebound from the working surfaces and shaping them so that at least the major components of the kinetic-energy transfer act in the direction of the desired deformation of the workpiece. Consequently, a piston utilized in a chamber wherein a pressure wave is generated by a spark or arc discharge, can be concave in the direction of this discharge with a curvature approximating that of the wave front contacting it. Furthermore, the chamber itself may be so shaped as to direct pressure components toward the working surface. More specifically, it may be pointed out that it is desirable to have this discharge develop at a constricted portion of the chamber, the chamber being concave in the direction of the working surface and of ellipsoidal or paraboloidal configuration so as to focus the pressure components toward the working surface.

The efficiency of conversion of electrical energy into mechanical energy can be increased still further when the pressure wave radiating in diametrically opposite directions from the discharge is utilized additively. Thus it is contemplated, in accordance with a further feature of this invention, to provide a pair of pistons, each in the path of the pressure wave front and at diametrically opposite locations with respect to the electrode axis and the discharge, the pistons serving as hammer and anvil respectively for compressing the workpiece therebetween. Additionally, the or each piston can include a vibratile member having a resonant frequency at approximately the frequency of the pressure wave for additively combining its inherent vibrations with the liquid-transmitted pressure shock developed subsequently to the initial shock. While deformation and bonding have been mentioned generally above, it should be pointed out that it has been found possible, with the aid of high-velocity impulsive pressure waves of the character described, to effect bonding of metal powders together, thereby producing bodies having the characteristics of sintered-metal bodies but without utilization of elevated temperatures. Moreover, similar results were obtainable when synthetic-resin powders were used and when attempts were made to bond synthetic resins to metal powders. In every case the bond had the characteristic of a fusion-type bond although elevated temperatures were not employed.

The above and other objects, features and advantages of the present invention will become more readily apparent from the following description, reference being made to the appended drawing in which.

Figure 1:
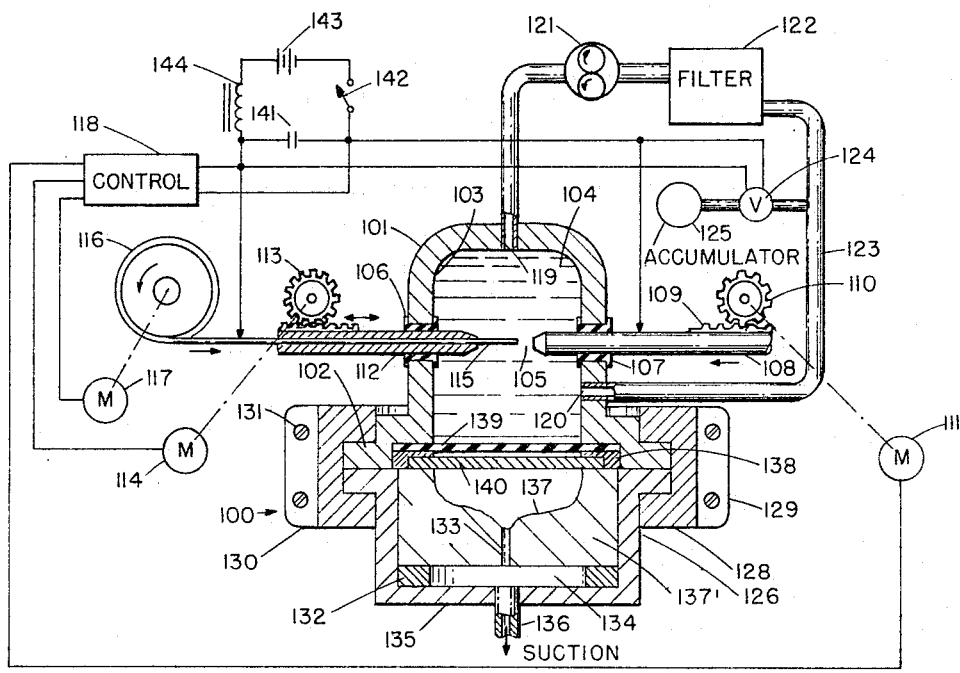
FIG. 1 is an axial cross-sectional view through an apparatus for the deep drawing of metallic plates in accordance with the present invention, the electrical circuit and control system therefore being shown diagrammatically.

In FIG. 1 I show a device 100 for the die forming of sheet metal, the device comprising essentially a closed fluid receptacle 101 containing the dielectric liquid in which the pressure wave is to be developed; the receptacle 101 is provided with an annular flange 102 and receives the dielectric 104 within its chamber 103, a spark gap 105 being formed between a pair of electrodes 108, 115 slidably displaceable within insulating bushings 106, 107, respectively. A relatively massive electrode 108 is provided with a rack 109 with which a pinion 110 meshes, this pinion being driven by a motor 111 from a control circuit 118 responsive to the potential across the spark at 105 and, consequently, to the size of the electrode gap. The thin wire electrode 115 is supplied by a reel 116 driven by a motor 117 in response to the control 118 so that additional electrode material is fed into the gap when portions of the wire burn away. The electrode 115 passes through the interior of another massive electrode 112 whose rack is operated by a pinion 113 and a motor 114 from the control device 118. An outlet tube 119 draws the dielectric liquid 104 from the chamber 103 while an inlet tube 120 feeds fresh dielectric liquid to the chamber. This continuous circulation of the liquid by a pressure pump 121 ensures that detritus from the electrodes 108, 112, 115 will be removed from the region of the spark gap 105 as soon as it is formed and that the composition of the liquid will remain substantially constant. A filter 122 is provided in series with pump 121 to permit recirculation of the liquid and thus reduce the cost of its replacement. A pressure accumulator 125, which can be charged by conventional means not shown, is maintained at a pressure above that within chamber 103 and is connected to the conduit 123 supplying inlet 120 via an electromagnetically controlled valve 124 responsive to the voltage across the electrode gap. When a spark is developed across gap 105, valve 124 opens to discharge the accumulator 125 into conduit 123 and thus raise the pressure within chamber 103. This arrangement is advantageous since the voltage level necessary to break down the dielectric in gap 105 is a function of the pressure within chamber 103. The use of accumulator 125 permits maintenance of a superatmospheric pressure within chamber 103 which is, however, not excessively high but permits the instantaneous increase in the pressure within this chamber when the discharge is produced and the pressure wave formed. The pressure wave is thus superimposed upon the static pressure developed in chamber 103 by accumulator 125.

A hollow shell 126 has an annular flange 127 adapted to bear against annular flange 102 of receptacle 101, these flanges being held against escape of liquid via a clamp 128, only one half of which is illustrated in FIG. 1. The two halves of the clamp are secured together by bolts 131 passing through lugs 129, 130 of the clamp. A ring 132 interposed between the base 135 of shell 126 and the bottom of die 137', maintains a compartment 134 serving as a manifold into which a plurality of bores 133 in die 137' open. A suction tube 136 is connected to a source of reduced pressure for evacuating the die cavity 137 via bores 133. A plate 140 of the material to be formed overlies the mouth of the cavity 137 and is held in place by a flange ring 138 upon which rests a diaphragm 139 of elastomeric material, this diaphragm being sealingly seated against the vessel 101 and forming the movable wall of chamber 103. The electrodes are connected in series with the capacitor 141 bridged by a battery 143 in series with a switch 142 and a pulse-shaping inductance 144.

When switch 142 is closed, battery 143 charges capacitor 141 until the breakdown potential of the electrolyte in gap 105 is exceeded. Upon breakdown, a spark is initiated between the relatively thin electrode 115 and the massive electrode 108 with conduction of electric current until the projecting portion of electrode 115 melts away and a spark develops between electrodes 112 and 108. This function of the electrode will be described further with respect to FIG. 2 and Example I. In any event, the electrical discharge developed between electrodes 112 and 108 produces a highspeed pressure wave which traverses the liquid medium 104 and impinges upon diaphragm 139, pressing this piston against workpiece 140 and deforming it into the configuration of mold cavity 137.

Figure 2:
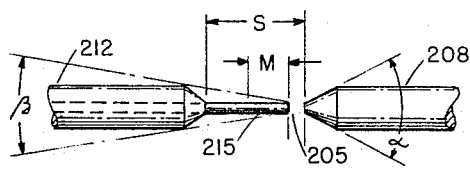
FIG. 2 is an enlarged detail view of the electrode system of a device of the type shown in FIG. 1.

While, in many cases, a single discharge is sufficient to deform the metal sheet 140 completely, repeated discharges may be used where necessary. As capacitor 141 is drained, the potential across the gap 105 reduces and the spark is finally quenched so that the charging process begins again. Concurrently, control circuit 118 senses the rise in potential across electrode bodies 112, 108 and operates motor 117 to feed an additional length of the thin electrode 115 into the gap. The control circuit 118 is also responsive to the absolute value of the potential between electrodes 112, 108 prior to feed of the thin electrode 115 and, via servo-motors 114 and/or 111 repositions electrodes 112, 108 to compensate for any wear of these electrodes. Evacuation of die cavity 137 via tube 136 prevents the air within this cavity from restricting deformation of plate 140. Referring now to FIG. 2, it may be pointed out that the juxtaposition of two pointed electrodes directly to form the gap (see FIGS. 3 and 5) results in a rapid development and decline of the discharge and, consequently, of the pressure pulse. To gain maximum utilization of the electrical energy and increase the total energy transferred to the workpiece, it is desirable to prolong the duration of the discharge and produce a pressure pulse which, integrated as a function of time, will carry a greater amount of energy than the sharper pulse otherwise resulting. The electrode system of FIG. 2 permits such an increase in the duration of the pressure pulse. When the capacitor discharges, the breakdown of dielectric takes place across the relatively narrow gap 205 and electric current is thus conducted between electrodes 212 and 208 via the wire electrode 215. The diameter of the latter is selected so that the current carried by the electrodes is sufficient to melt this wire. If it is assumed that the terminal portion M of electrode 215 melts originally, it will be observed that the spark discharge is now conducted across a gap whose length is equal to the distance M plus the length of the original gap 205. Eventually, electrode 215 is eroded over its entire length so that the discharge gap is equal to the distance S between the massive electrode 208 and 212. The arc fusion of the exposed length of electrode wire 215 requires a definite time depending upon the discharge current, composition of the electrode wire, and the size of the original gap 205. It will be clear, therefore, that by proper choice of these parameters any desired duration of discharge can be obtained. In general, it may be pointed out that the use of the thin wire 215 is equivalent to the provision of an electrode whose apex angle $\beta$ is exceptionally small. The smaller this angle, the greater the fusible length of electrode and, consequently, the longer the duration of the spark. In practice, however, it has been found to be difficult to use two electrodes having small apex angles or projecting lengths of electrode wire. This difficulty arises from the nonuniformity of available electrode material and the inability of the control circuit 118 to determine which of the electrodes has eroded to the greater extent. It is, therefore, contemplated in accordance with the present invention to employ a relatively massive electrode, i.e. electrode 208, having a relatively large apex angle $\alpha$ (e.g. of 45 degrees) while the counter-electrode 212 is formed with a small apex angle or with a projecting length of electrode wire.

*Example I*

In an apparatus of the type illustrated in FIG. 1 with an electrode system as shown in FIG. 2, a sheet-metal workpiece of low-carbon steel having a thickness of 0.5 mm. and a diameter of 115 mm. were deep drawn to a depth of 5 mm. Diaphragm 139 was composed of rubber and had a thickness of 3 mm. while the pressure within chamber 103 was maintained at 5 kg./cm.$^2$ gauge by pump 121. Electrode 107 was composed of aluminum and had a diameter of 10 mm. with an apex angle $\alpha$ of 45°. An initial test was made with a counterelectrode 112 of similar dimensions without the thin wire 115. An energy of $1.5 \times 10^4$ joules was supplied to the electrodes via capacitor 141, the parameters of the energizing system being such that a pulse duration of approximately 200 microseconds resulted. Under these circumstances the forming speed, i.e. the velocity of the workpiece 140 and, consequently, the apparent velocity of the pressure wave, was approximately 270 m./sec. When, however, a single wire 115 composed of aluminum and having a diameter of 0.43 mm. was used, a forming speed of Mach 2.4 resulted. The dielectric liquid 104 was transformer oil. In addition, the apparatus of FIG. 1 employed similarly dimensioned aluminum electrodes with apex angles of 15°, 30° and 180° (i.e. parallel faces), respectively. It was found that the integrated energy of the increase, with decreasing apex, having relative values of 1, 1.3, 1.7, 2 and 3, for the flat-faced electrodes, those of 45°, 30°, 15° and the wire electrode illustrated in FIG. 2, respectively.

Figure 3:
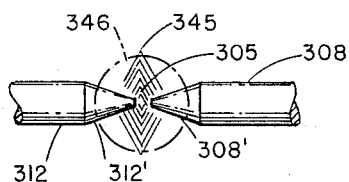
FIG. 3 is a view similar to FIG. 2 of another electrode system.

In FIG. 3 I show a pair of electrodes 308, 312 having relatively small apex angles, the pointed portions 308', 312' of these electrodes having large surface areas transverse to the plane perpendicular to the electrode axis. The developed spark is illustrated diagrammatically at 305 from whence it can be seen that the predominant direction of spark extension is in this plane transverse to the axis of the electrodes. The shock wave is illustrated diagrammatically at 345. Dot-dash lines 346 show a spherical shock wave of the type emanating from the conventional point source. It will be immediately apparent that the shock wave encountered in the present invention is not of the spheroidal type but is axially symmetrical and can be described as a circular wave centered on the axis of the electrode and radiating therefrom in a plane perpendicular to the axis. The wave from 345 is, however, somewhat arcuate so that the interception of the wave front by a concave surface results in a maximum transformation of the pressure wave energy into displacement perpendicular to the axis of the electrodes.

Figure 5:
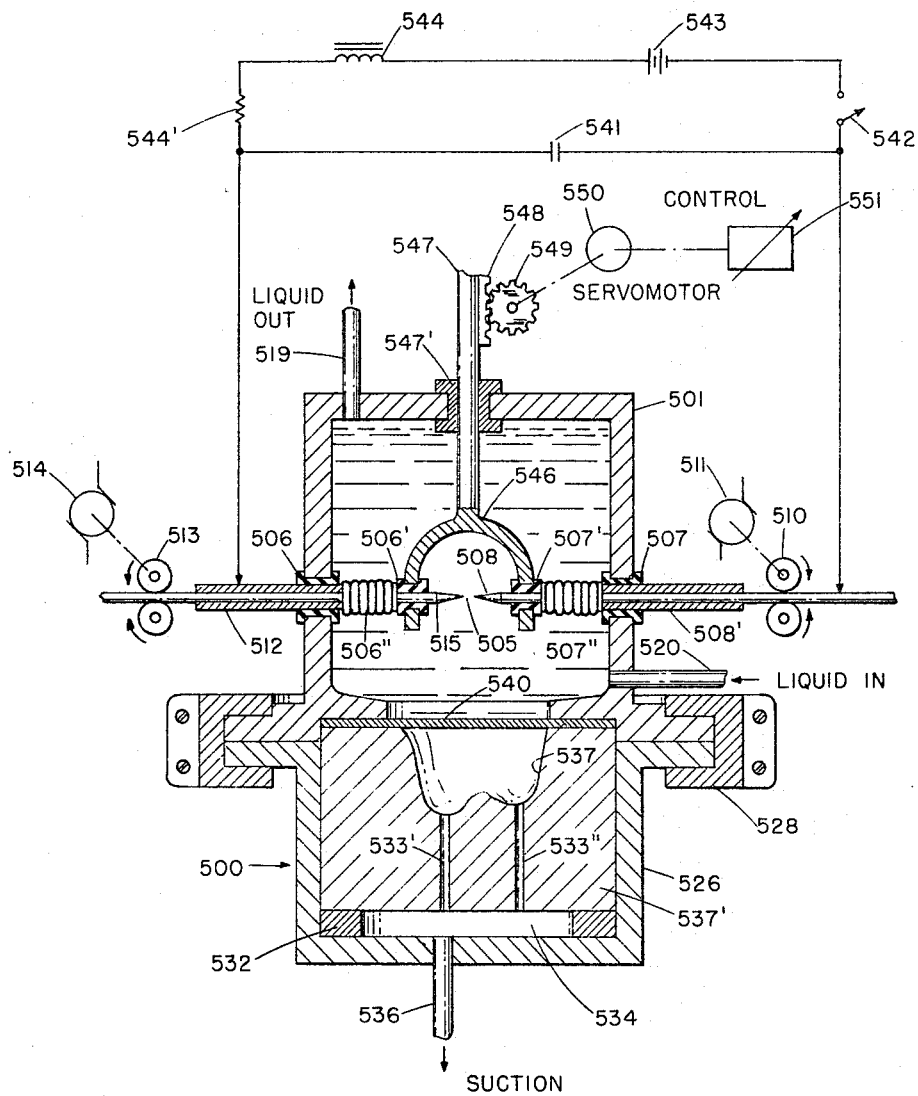
FIG. 5 is a view similar to FIG. 1 illustrating a modified apparatus.

In FIG. 5 I show an arrangement wherein the distance of the spark gap 505 from the energy-receiving surface or workpiece 540 is adjustable. In the apparatus 500, the liquid receptacle 501 is provided with a liquid outlet 519 and a liquid inlet 520 connected in series with a pressure pump and a filter in the manner described with reference to FIG. 1. A bushing 547' in the wall of vessel 501 directly opposite the workpiece 540 slidably receives a rod 547 having a rack 548 driven by a pinion 549 whose servomotor 550 is adjustable manually by a control circuit 551. Rod 547 has a bifurcated extremity 546 in the arms of which are positioned insulating sleeves 506' and 507' through which pass the respective electrodes 508 and 515 forming the spark gap 505. While the electrodes are shown to be of the pointed type (e.g. of the configuration illustrated in FIG. 3) it should be noted that they may also have electrode configurations of the type shown in FIGS. 2, 7 and 8, if desired. When the pointed structure is retained, however, it is best to utilize an apex angle of 45° although steeper angles provide greater energy transformation since, at an angle of 45°, there is a desirable compromise between electrode deterioration and energy conversion.

The electrodes 515 and 508 pass through respective bellows-type sleeves 506", 507" of elastomeric material and through bushings 506, 507 at diametrically opposite locations in the wall of cylinder 501. Guides 512 and 508' are provided for the electrode wires 515 and 508 which are fed by rollers 513 and 510 toward the gap 505. Roller 510 can be operated by a servomotor 511 while roller 513 is coupled with a servomotor 514 to respond to the potential across the electrode gap in the manner of the electrode-feed means of FIG. 1. The sleeves 506" and 507" constitute flexible couplings for the flexible wire electrodes enabling the gap 505 to be shifted toward and away from the surface of workpiece 540. Whereas the workpiece illustrated in FIG. 1 is separated from the fluid within the pressure receptacle by a resilient membrane, the workpiece 540 forms the wall of the vessel 501 directly and thus constitutes the movable piston. The workpiece 540 overlies the mouth of a die cavity 537 in the forming die 537', bores 533' and 533" communicating between this cavity and a manifold chamber 534 at the base of die 537'. The latter is supported in the lower half 526 of the apparatus housing by a ring 532 while a suction tube 536 communicates with chamber 534 to exhaust air from the die cavity 537. Again, the upper and lower portions 501 and 526 of the housing are connected together by means of a bipartite clamp 528. A capacitor 541 is connected across electrodes 508 and 515 while a battery 543 in series with a switch 542 and an inductor 544 is bridged across the capacitor. Resistor 544' represents the ohmic impedance of choke 544.

While the operation of the device of FIG. 5 is generally similar to that of FIG. 1, it should be noted that adjustment of the distance of the gap 505 from the workpiece 540 permits accurate deformation of the sheet material in the mold.

*Example II*

Figure 4:
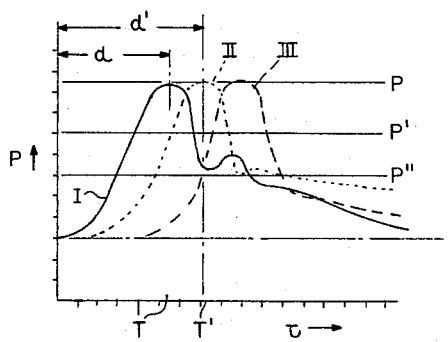
FIG. 4 is a graph of the amplitude of the pressure wave produced by an electrical discharge in a closed vessel with respect to time.

In the device of FIG. 5, utilizing a die having a depth of 100 mm., a diameter of 26 mm. and an aluminum workpiece 540 having a thickness of 2.5 mm., a discharge of 5000 joules was developed across the electrodes of capacitor 541. The duration of the pulse was approximately 200 microseconds. When a spark gap-to-workpiece distance of 25 mm. was employed, the drawing of the aluminum sheet was found to deviate from the die configuration by more than 0.006 mm. along the radius portions of the shape. In contradistinction, a distance of 100 mm. between the workpiece and the spark gap 505 was found to yield a ten times greater deviation at the correpsonding portions of the shaped body. It is believed that this difference in the effectiveness is a function, in part, of the imperfect wave-transmission characteristics of the dielectric liquid, in this case glycerine, maintained at a pressure of 5 kg./cm.² with continuous liquid circulation. Practically all liquids will evidence a similar damping of the wave. In FIG. 4 I graph a hypothetical pressure pulse with the ordinate representing increasing values of pressure and the abscissa increasing values of time. The time increments must be considered to be on the order of microseconds since the entire duration of the pulse is about 150–200 microseconds. Wave form I is initiated at an elevated pressure A since a super-atmospheric pressure is maintained within the vessel 501 prior to the electrical discharge. If the pulse is considered to travel at a velocity on the order of Mach 2.5, at a time T determined by the distance between the spark gap and the workpiece, the latter will receive the impact of the shock wave and be deformed, the shock wave travelling as indicated by the wave forms II and III. When the distance is assumed to be $d'$, the shock wave will be transmitted to the workpiece at time $T'$. Wave form I, however, also illustrates one form of attenuation of the pressure pulse and, if distance is considered to be plotted along the abscissa, it will be noted that the maximum pressure P is obtained only if distance $d$ is not exceeded. Reduced pressures $P'$ and $P''$ can be obtained by increasing the distance correspondingly. While a distance on the order of 25 mm. is suitable for the aluminum sheet mentioned above, it may be noted that distances below this value as well as those above result in inaccurate shaping of the workpiece.

Figure 6:
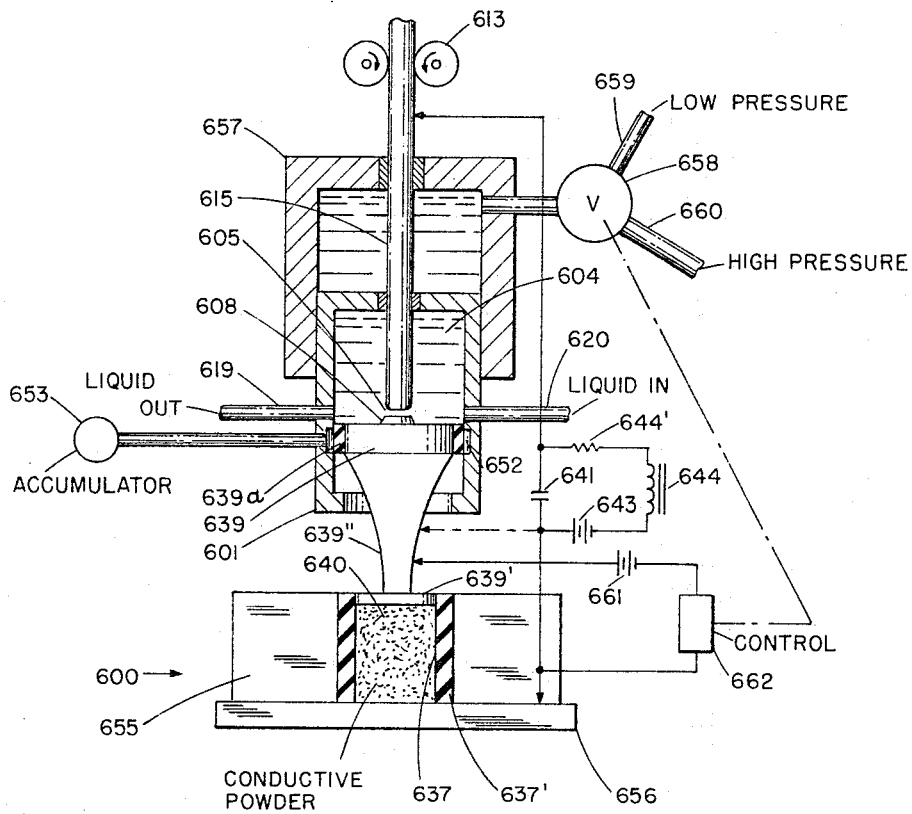
FIG. 6 is an axial cross-sectional view of an apparatus for the simultaneous compression and spark-sintering of a conductive powder.

In FIG. 6, I show still another apparatus 600 for the sintering of conductive as well as nonconductive particles. In copending application Ser. No. 247,387, filed December 26, 1962, I disclose the advantages of spark sintering of discrete bodies. In accordance with the principles of this invention, discrete particles of a conductive material or a mixture of conductive and nonconductive particles are disposed in relatively light contacting relationship so that the interfacial resistance is substantially greater than the internal resistance of the particles. When a capacitor is then discharged across the mass of particles, spark discharges develop in the interfacial areas and eventually merge so that the entire mass is penetrated by an electrical space discharge which apparently ionizes the material of the particles at these interfacial zones and causes the formation of conductive bridges. Subsequent passage of electric current is concentrated at these bridges, thereby heating the particles further and permitting their consolidation. While this method is highly suitable for the production of porous bodies and relatively low-density nonpermeable structures, the formation of high-density articles from particulate material has been found to require an increase in the pressure applied to the particles upon conclusion of the bridge forming stage. In FIG. 6 I show an apparatus wherein these results are obtainable. The device 600 comprises a fluid receptacle 601 which itself constitutes the piston of a hydraulic cylinder 657. Inlet and outlet tubes 620 and 619 circulate the liquid medium 604 within vessel 601 via a filter as previously described. A piston 639 is slidably displaceable within vessel 601 and is provided with an insulating lining 639a. Piston 639 carries a deposit 608 of electrode material and thus constitutes one of the electrodes forming the spark gap 605, the other electrode being a rod or wire 615 adapted to be fed into vessel 601 by rollers 613 in response to an alteration in the size of the spark gap. A thin-wire electrode can be assumed to pass through the interior of electrode 615 in the manner shown in FIG. 2 for juxtaposition with the mass of electrode 608; this thin-wire electrode is not illustrated in order to prevent cluttering of the drawing. A vibratile bar 639″, whose resonant frequency is approximately equal to the resonant frequency of the discharge across gap 605, connects piston 639 with a plate 639′ for compression of a conductive powder 640 retained within the cavity 637 of an electrically insulating sleeve 637′ which is reinforced by ribs 655 and mounted upon the metal plate 656. The two-position valve 658 is connected in series with the hydraulic cylinder 657 and is supplied by a low-pressure conduit 659 and a high-pressure conduit 660, valve 658 being operated by a control circuit 662 in response to the voltage drop across the mass of particles 640; a battery 661, in series with the control circuit 662, provides the necessary current for circuit 662. The discharge energy is supplied by a capacitor 641 connected between plate 656 and electrode 615, capacitor 641 being bridged by a battery 643 in circuit with an inductance 644 and a resistance 644′. Vessel 601 is provided with an annular recess 652, normally blocked by piston 639, which communicates with a high-pressure accumulator 653.

When conductive particles are employed, capacitor 641 discharges to develop simultaneous sparks at gap 605 and through the particle mass, thereby forming conductive bridges among the particles. The shock wave within vessel 601 rebounds against the piston 639 so that the force of this piston compresses the conductive powder at the conclusion of the electrical discharge. Simultaneously, control 662 senses the decreased voltage drop across the mass of particles and energizes valve 658 to cut off the low-pressure fluid supply to cylinder 657 which formerly displaced vessel 601 to follow the shrinkage of the particle mass and cut in the high-pressure conduit. The conductive powder, now sintered into a porous mass but still in a plastic state, is thus subjected to the additive pressure of source 660 and the pressure wave within vessel 601. When nonconductive particles are used, capacitor 641 is connected to the piston 639 as indicated by the dot-dash conductor 663 whereupon the pressure of the discharge at gap 605 is applied to the particles without initial formation of bridges across them by electrical discharge.

*Example III*

A mass of polytetrafluoroethylene particles of 200 mesh are disposed in a nonconductive sleeve having a diameter of 15 mm. and a length of 2 cm. Light pressure was applied at hydraulic cylinder 657 to compress the particles (approximately 1 kg./cm.²) while a discharge in silicone oil within vessel 601 was created. Electrodes composed of an aluminum-copper alloy were used while the single discharge pulse had a duration of 150 microseconds and an energy of 1500 joules. The resulting coherent body had all of the characteristics of a body molded at elevated temperatures although the powder was held at room temperature for the duration of the process.

*Example IV*

The procedure of Example III was followed, except that nickel particles and a spark energy of 5000 joules was used between plate 656 and electrode 615. The pressure applied by cylinder 657 to the particles was 1 kg./cm.², this pressure being followed upon reduction of the voltage drop across the mass of particles to a value of 500 kg./cm.², the discharge terminating concurrently with the increase in pressure. The resulting body had the density of greater than 90% of that of the solid mass.

*Example V*

It is well known that so-called "shot-peening" and shot-blasting techniques make use of spherical bodies which are used in large numbers and directed against an article to be treated at high velocity in an air stream. I have found that the efficiency of shot peening and shot blasting can be materially increased when the spherical shot is provided with sharp edges and uniform deformities. Heretofore, however, it has been difficult to provide uniform deformities upon bodies of this type in an inexpensive manner. Utilizing a device of the type illustrated in FIG. 6, however, it has now become possible. Five hundred steel balls having a diameter of 0.5 mm. were stacked in a cavity 637 and subjected to pressure derived from an arc discharge having an energy of 5000 joules for the single pulse; the pulse duration was 100 microseconds. An initial vibration of plate 656 settled the balls into a close-packed structure so that the resulting deformation had hexagonal character. A machining efficiency upwards of 50% above that attainable with the smooth surface balls was realized.

Example VI

The method of Example V was followed except that, in addition to the steel balls, approximately 10% by weight of the balls of a chromium oxide powder ($Cr_2O_3$) of 10–30 microns particle size was added to the cavity. Approximately 70% of the chromium oxide particles were bonded to the balls and another increase in machining efficiency was attained.

Figure 7:
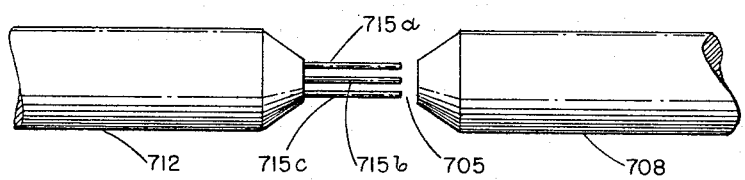
FIGS. 7 and 8 are enlarged views illustrating further electrode systems in elevation.

In FIG. 7 there is shown an electrode system wherein the relatively massive electrode 708 is juxtaposed with three wire electrodes 715a, 715b, 715c arrayed in an axial plane of the electrodes but spaced in the direction of main pressure-wave propagation. The thin wire electrodes can be fed by suitable servo means from another massive electrode 712, a large arc discharge developing between the massive electrode 708, 712 upon melting away of the wires. Since a plurality of electrode wires are used in this instance, a spark initially jumps the gap 705 between the electrodes 715a, 715b or 715c proximal to electrode 708, thereby ionizing the liquid in the region of the remaining electrode wires to institute discharge at these wires. Meanwhile, the wires which develop the earliest discharge conduct large electric currents and melt away until all of the wires have burned away and discharge between electrode 712 and 708 is instituted directly. It will be understood that this arrangement increases the pulse duration to a large extent. Moreover, since the spark is propagated from one thin wire to another, an additive pressure pulse will result. When multiple pulses are employed, the spacing of electrodes 715a–715c should be so selected that the pressure wave propagation between the electrodes is approximately equal to the frequency of repetition for further addition of the pressure effects.

Figure 8:
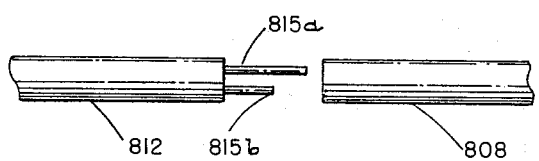

The electrode system of FIG. 8 is characterized by an additional slow discharge, as a spark is developed between the thin wire 815a and the mass of electrode 808, this long wire burning back to produce a pulse of long duration. Subsequently, discharge is initiated between the shorter electrode 815b and electrode 808 so that electrode 815b burns back now somewhat more rapidly until the final discharge developes between electrode 812 and its counterelectrode 808.

I have found that certain relationships between the electrode material and the dielectric liquid should be observed if maximum energy transmission is to be obtained. It will be readily apparent, for example, that the transformation of the electrical energy of a spark or arc discharge to mechanical energy takes place in several ways. As is the usual case, the discharge is formed when atoms and molecules of the material in the breakdown gap are subjected to high electric-field intensity (between $10^5$ and $10^6$ volts/cm.). Electrons are drawn by this field at high velocity out of a donor atom and eventually impinge upon either a molecule of the dielectric liquid, or an atom of gas produced by vaporization of the liquid or electrode material, a decomposition product of the dielectric, or particles of the electrode material, all generally present in an ionized state. The current passage between the electrodes will then be seen to be determined by the relationship $$I \sim \frac{ne^2 t}{m}$$

wherein $n$ is the number of particles, $e$ the electron charge and $m$ is the particle mass. The energy of electron motion and the recoil energy of the donor particle is transferred to the molecule, atom or ion, part of this transferred energy being converted into molecular vibration, part into light emission and part into energy of translation. Only the latter energy is usable in accordance with the principles of the present invention. Since the basic kinetic energy E is equal to $\frac{1}{2}$ $mv^2$, it is desirable to have those particles whose collision is required to propagate the pressure wave at approxiately the same mass. There are two primary ramifications to this principle. In the first place, it must be noted that principal energy transfer throughout the body of the medium takes place between collisions of the atoms or molecules of the dielectric liquid. Consequently, it is an important feature of the present invention that the composition of the dielectric liquid be maintained substantially constant so that any particles deviating in large measure from the desired molecular weight are screened out. This can be done by conventional methods with the aid of filter devices. More specifically, I have discovered that maximum energy transfer is obtained when the molecular weight of the dielectric liquid ranges between 30 and 700 and does not deviate in the course of the treatment by more than 50 above and below the predetermined molecular weight. Thus, if the liquid is assumed to have a molecular weight of 250, the circulating system should maintain the molecular weight between 200 and 300 in accordance with the present invention. The use of a dielectric liquid having a substantially constant molecular weight is an important characteristic of the instant invention.

Secondly, the major portion of the kinetic-energy transfer takes place from atoms or ions of electrode material eroded from the electrodes, these atoms and ions having relatively high velocities as a consequence of their acceleration in the electric field, their thermal energy at the elevated temperatures of the discharge and their initial velocity upon formation of the discharge. It has been discovered that optimum transfer of energy from the electrode material to the dielectric liquid is essential and that such optimum transfer takes place when the mass of the particles forming the electrode is approximately equal to the mass of the particles contained within the dielectric liquid. It may be pointed out that, when the mass of all of the particles composing the dielectric liquid is relatively small and the molecular weight of the compound either excessively large so that only limited translational energy can be imparted thereto or relatively small so that collison of an electrode particle with a liquid particle produces energy in a vibrational mode, which ruptures the molecule of the liquid, low conversion efficiencies are obtained. It is, consequently, an important feature of the present invention that the electrode material be a substance whose atomic weight approximates the atomic weight of one or more atoms of the substances constituting the dielectric liquid. When the electrode has a tendency to decompose into molecules, the molecular weight of the electrode material should approximate either the molecular weight of the dielectric liquid of the atomic weight of a substance constituting it. In general, it may be observed that effective results are obtained when the dielectric liquid contains atoms of a substance whose atomic weight does not differ by more than 10 from the atomic weight of a substance incorporated in the electrode. Thus the electrode can be composed of one or more of the following elements: carbon, sodium, magnesium, aluminum and calcium, the elements having low specific gravity being preferred as pointed out in my copending application Ser. No. 41,080. The dielectric liquid may then contain atoms of silicon, oxygen, nitrogen, chlorine, phosphorus, sulfur and iodine, compounds having the general formula $C_xH_yR_z$ being preferred. In this relationship $x$ designates the number of carbon atoms C present in the dielectric liquid while $y$ and $z$ indicate the number of hydrogen atoms H and the number of energy absorbing atoms R, respectively. Among the suitable oxygen-containing dielectrics are glycerine and sugar solutions, silicone-oils, higher phosphines and amines constituting suitable silicon-, phosphorus- and nitrogen-containing compounds. The alkyl halides of chlorine and iodine are also suitable. Iodine compounds play an important role when heavy-metal electrodes (e.g. copper or lead) are employed while oxygen-containing compounds such as those mentioned previously and carboxylic acids are particularly suitable when carbon electrodes are employed. For the latter, it is also desirable to use kerosene oil or benzene. For aluminum electrodes of the type described above, phosphorus and silicone compounds (e.g. SiCH) are desirable.

Figure 9:
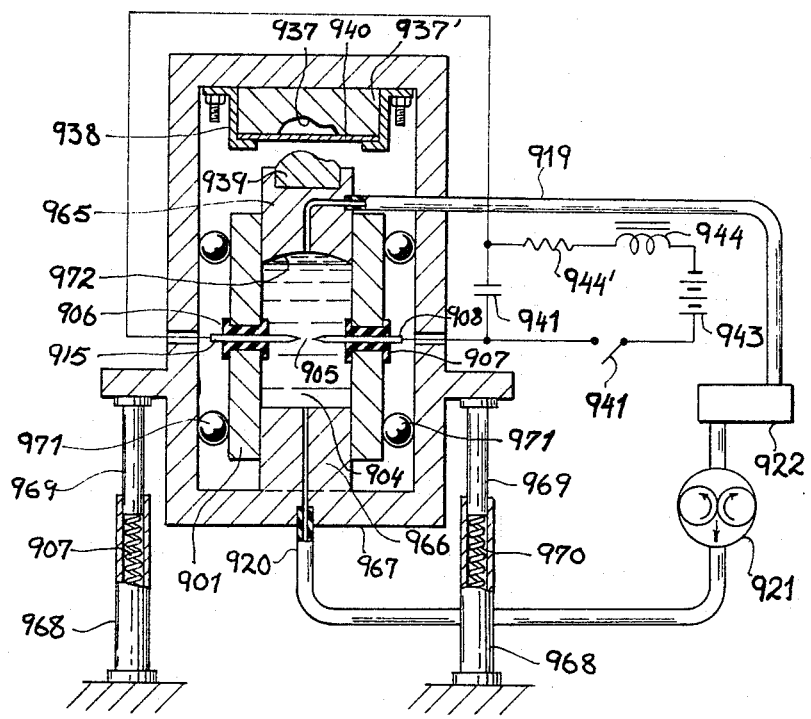
FIG. 9 is an axial cross-sectional view through an apparatus for the die pressing of sheet material.

FIG. 9 shows an arrangement wherein approximately twice the pressure of the previously described system, with similar electrical parameters can be converted into useful work. In this system, the pressure vessel 901 is formed as an open-ended cylinder within which a piston 965 is slidably displaceable. A further piston 966 is disposed in the opposite end of vessel 901 and is formed with an inlet tube 920 while piston 965 has an outlet tube 919 for circulation of the dielectric liquid 904 by pump 921 via filter 922. Piston 965 carries a forming die 939 adapted to drive a synthetic-resin plate 940 into the cavity 937 of a die 937' secured at 938 to a housing 967. The latter is integral with piston 966 and thus movable therewith and is mounted upon a plurality of legs 969 resiliently supported by springs 970 on pedestals 968. Vessel 901 is shiftable with respect to the housing 967 on antifriction bearings 971 and is provided with a pair of insulating bushings 906, 907 through which pass the electrodes 908, 915 to form the spark gap 905. A capacitor 941 is connected across the electrodes 908, 915 and in parallel with a battery 943 via switch 942, an inductor 944 and a resistor 944'. The inner surface 972 of piston 965 is concave in the direction of spark gap 905 to reduce kinetic rebounding of the pressure wave. Vessel 901 can be held stationary by a support not shown or floatingly displaceable within housing 967.

The shock wave developed at spark gap 905 radiates circularly in a symmetrical manner about the axis of the discharge. Thus, only that portion of the shock wave intercepted by surface 972 is directly acted upon by this wave. The diametrically opposite component of the shock wave is, in the apparatus of FIG. 9, transferred to die 937', as this member of the die moves toward the head 939 with approximately twice the velocity with which forming of the workpiece was done heretofore. In addition, the effective energy transfer is more than twice the energy derivable from diametrically opposite locations of a spherical shock wave as a consequence of the flattened configuration of the wave produced by the spark discharge between electrodes 908 and 915.

Figure 10:
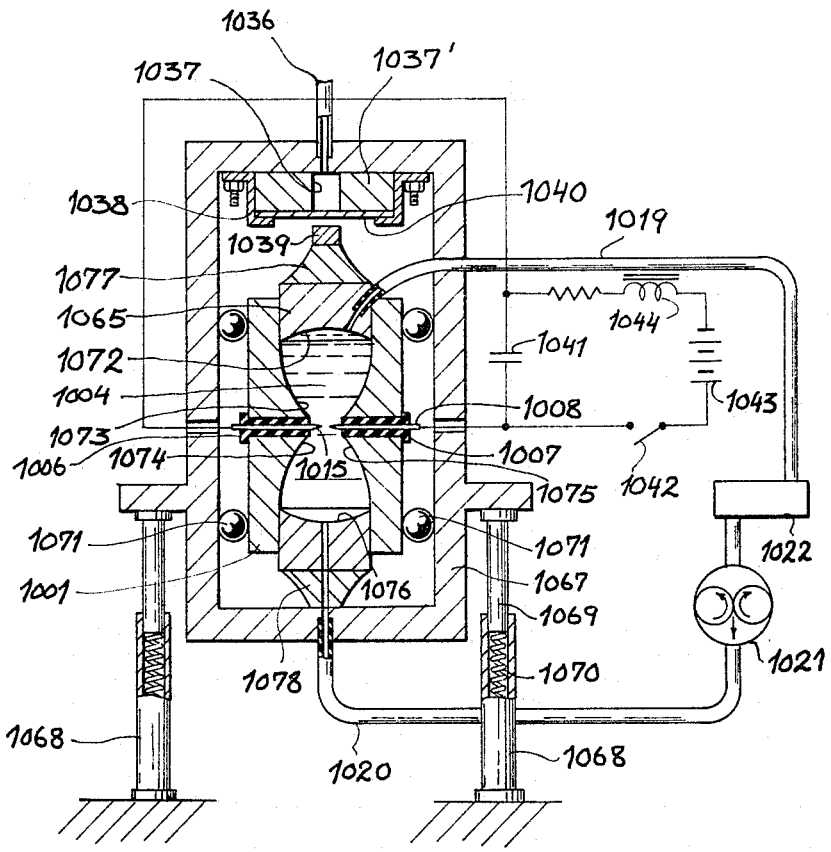
FIG. 10 is a view similar to FIG. 9 showing a punch apparatus in accordance with the present invention.

In FIG. 10 there is shown a generally similar device wherein, however, the effective pressure is increased still further. In this device, the housing 1067 carries the die 1037' which is formed with a cutting aperture 1037 evacuated at tube 1036. The cutting head 1039 is carried upon piston 1065 via a vibratile member 1077 whose natural frequency of vibration is equal to that of the discharge. Clamps 1038 secure the workpiece 1040 in place. Piston 1065 is provided with an outlet 1019 connected via circulating pump 1021 and filter 1022 to the inlet tube 1020 for the circulation of the dielectric liquid 1004 through the pressure vessel 1001. The latter is provided with an intermediate constriction 1075 at which insulating sleeves 1006 and 1007 support the electrodes 1008 and 1015. The pressure chamber is shaped with paraboloidal compartments 1073 and 1074 diverging in the direction of the concave energy-receiving surfaces 1072 and 1076 of the piston 1065 and a further piston 1078, respectively. The latter piston bars against the housing 1067 for transmission of the motion of the the pressure wave thereto. Bearings 1071 permit relative displacement of vessel 1001 and housing 1067, the latter being mounted upon legs 1069 for displacement when vessel 1001 is held stationary. Legs 1069 are carried by springs 1070 within pedestals 1068. When a spark is generated across the electrode gap by discharge of capacitor 1041, pistons 1065 and 1078 are driven in opposite directions to punch or die-cut workpiece 1040. A battery 1043 energizes capacitor 1041 via an inductance 1044 and a switch 1042.

In the devices of FIGS. 9 and 10, means similar to that illustrated in FIG. 5 can be provided for advancing the electrodes which, as is the case with the previous embodiments, are illustrated as pointed electrodes although, for best results, it is desirable that one or both of the electrodes have thin wire members projecting therefrom. In the device of FIG. 5 it is possible to arrange the bifurcated member 546, 547 so that it resonates substantially at the spark frequency in the manner of a tuning fork, thereby further increasing the energy developed. The energy transfer obtainable in the device of FIG. 10 ranges from 30% to 60% greater than the conversion possible with the device of FIG. 9, this increase being due to elimination of rebounding and a more effective use of a pressure-wave component. Rebounding can also be prevented through the use of the system illustrated in FIG. 6. In this case the annular recess 652 is maintained at the elevated pressure of accumulator 653, i.e. well above the pressure of the liquid in the region of gap 605. When the piston 639 is displaced by the pressure wave to compact the particles 640, communication is established between recess 652 and the pressure chamber of vessel 601, thereby sharply increasing the force applied to the piston and attenuating the rebound effect.

*Example VII*

An apparatus of the type shown in FIG. 9 was employed to form an aluminum sheet of 0.5 mm. thickness to a depth of 75 mm. A discharge of 3000 joules was developed by capacitor 941 across the spark gap and a pressure of 10 kg./cm.$^2$ maintained in vessel 901. The discharge produced a shock wave having a duration on the order of 100 microseconds and yielded a forming force in excess of 200 t./cm.$^2$. The velocity of the workpiece relative to the die head was 350 m./sec. as compared with 150 m./sec. in a situation wherein both the die 137' and the housing 901 were held stationary. An increase in the energy of 30 to 60% was gained when similar parameters were used with the device of FIG. 10. In both cases electrodes having a diameter of 10 mm. and composed of aluminum were used with a glycerine dielectric. In general, it may be pointed out that for all the above examples capacitors having a capacitance between 0.01 and 10,000 microfarads at potentials between 500 and 50,000 volts can be employed. The spark gap should be maintained between 0.01 and 5 mm. while the circulation can be sufficient to replace the contents of the pressure vessel once during every second of operation although higher flow rates are desirable.

The invention described and illustrated herein is believed to admit of many modifications within the ability of persons skilled in the art, all such modifications being considered within the spirit and scope of the appended claims.

What is claimed is:
1. A method of shaping a body, comprising the steps of forming a closed pressure vessel having at least one movable energy-receiving surface for transferring pressure from said vessel to said body, immersing electric-discharge means including at least two electrodes spaced apart within a liquid medium filling said vessel, one of said electrodes having an elongated portion fusible upon development of a spark between said electrodes, and impulsively triggering said electric-discharge means for producing an initial spark discharge across interelectrode gap with subsequent melting of said fusible portion and lengthening of the spark within said vessel to generate a pressure wave in said medium directed against said surface.

2. A method of shaping a body, comprising the steps of forming a closed pressure vessel having at least one movable energy-receiving surface for transferring pressure from said vessel to said body, immersing electric discharge means including at least two electrodes spaced apart within a liquid medium filling said vessel, one of said electrodes having an elongated portion fusible upon development of a spark between said electrodes, impulsively triggering said electric discharge means for producing an initial spark discharge across the interelectrode gap with subsequent melting of said fusible portion and lengthening of the spark within said vessel to generate a pressure wave in said medium directed against said surface, and circulating said medium through said vessel in the region of said electric-discharge means.

3. A method of shaping a body comprising the steps of forming a closed pressure vessel having at least one concave movable energy-receiving surface for transferring pressure from said vessel to said body, immersing electric-discharge means including at least two electrodes spaced apart within a liquid medium filling said vessel, one of said electrodes having an elongated portion fusible upon development of a spark between said electrodes, and impulsively triggering said electric-discharge means for producing an initial spark discharge across the interelectrode gap with subsequent melting of said fusible portion and lengthening of the spark within said vessel to generate a pressure wave in said medium directed against said surface.

4. A method of shaping a body, comprising the steps of forming a closed pressure vessel having at least one movable energy-receiving surface for transferring pressure from said vessel to said body, immersing electric-discharge means including at least two electrodes spaced apart within a liquid medium filling said vessel at an elevated pressure, one of said electrodes having an elongated portion fusible upon development of a spark between said electrodes, impulsively triggering said electric-discharge means for producing a spark discharge across the interelectrode gap with subsequent melting of said fusible portion and lengthening of the spark within said vessel to generate a pressure wave in said medium directed against said surface, and circulating said medium through said vessel in the region of said electric-discharge means while maintaining the molecular weight of said medium substantially constant.

5. A method of shaping a body between two movable members comprising the steps of forming a closed pressure vessel having at least two opposite energy-receiving surfaces for transferring pressure from said vessel to said body, immersing at least two spaced electrodes within a liquid medium filling said vessel, connecting said surfaces with said members in a manner such that a pressure wave radiating from said electrodes and impinging upon said surfaces will be converted to forces comprising said body between said members, and impulsively triggering a spark discharge across said electrodes to generate said pressure wave in said medium.

6. A method of shaping a body between two movable members comprising the steps of forming a closed pressure vessel having at least two opposite energy-receiving surfaces for transferring pressure from said vessel to said body, immersing at least two spaced electrodes within a liquid medium filling said vessel, connecting said surfaces with said members in a manner such that a pressure wave radiating from said electrodes and impinging upon said surfaces will be converted to forces comprising said body between said members, impulsively triggering a spark discharge across said electrode to generate said pressure wave in said medium, and circulating said medium through said vessel in the region of said spark discharge.

7. An apparatus for the shaping of a body comprising a substantially closed pressure vessel having at least one movable energy-receiving surface, means for transferring pressure upon said surface to said body, a pair of spaced electrodes having a gap disposed within said vessel, energizing means for impulsively triggering a spark discharge across said electrodes, and a liquid medium filling said vessel, at least one of said electrodes including an elongated fusible portion adapted to melt upon the passage of electric current between said electrodes for increasing the gap therebetween.

8. An apparatus as defined in claim 7, further comprising circulating means for withdrawing and replenishing said medium in said vessel.

9. An apparatus as defined in claim 8, further comprising filter means in said circulating means for purifying said medium.

10. An apparatus as defined in claim 7 wherein said one of said electrodes includes a relatively massive conductive body and said fusible portion is a relatively thin wire passing through said body the other of said electrodes being a relatively massive body spacedly juxtaposed with said wire.

11. An apparatus as defined in claim 10, further comprising means for advancing additional lengths of said wire into said gap upon melting of the wire within the gap.

12. An apparatus as defined in claim 10 wherein a plurality of relatively thin wires are spaced apart in the direction of said surface of said one of said electrodes.

13. An apparatus as defined in claim 7 wherein said surface is concave in the direction of said electrodes.

14. An apparatus as defined in claim 7 wherein said vessel has a constricted portion in the region of said electrodes and diverges in the direction of said surface.

15. An apparatus as defined in claim 7 wherein a further energy-receiving surface is movably positioned in said vessel diametrically opposed the first-mentioned surface with respect to said electrodes, said surfaces each being associated with a respective forming member adapted to bear upon said body when the latter is positioned therebetween for entraining said members.

16. An apparatus as defined in claim 7, further comprising means for adjusting the distance between said electrodes and said surface.

References Cited by the Examiner

UNITED STATES PATENTS

| 2,559,227 | 7/1951 | Rieber | 113—44 |
| 2,876,083 | 3/1959 | Prietl | 23—209.1 |

FOREIGN PATENTS

| 119,435 | 3/1958 | Russia. |

OTHER REFERENCES

"Explosives Form Space Age Shapes," Steel, pp. 82–86, Aug. 25, 1958.

CHARLES W. LANHAM, *Primary Examiner.*

WILLIAM J. STEPHENSON, *Examiner.*

G. P. CROSBY, *Assistant Examiner.*